United States Patent
Moteki et al.

[11] Patent Number: 6,094,451
[45] Date of Patent: Jul. 25, 2000

[54] RADIO RECEIVER USING LEVEL-VARIABLE REFERENCE, SIGNAL FOR DISCRIMINATIVE DETECTION OF DATA SIGNAL AND SIGNAL DISCRIMINATION METHOD

[75] Inventors: Minoru Moteki, Chigasaki; Daini Okajima, Yokohama; Kazuhide Tamizu, Ebina; Kenji Tamaru, Yokohama, all of Japan

[73] Assignees: Hitachi, Ltd., Tokyo; Hitachi Media Electronics Co., Ltd., Iwata-ken, both of Japan

[21] Appl. No.: 08/593,085

[22] Filed: Jan. 29, 1996

[30] Foreign Application Priority Data

Feb. 7, 1995 [JP] Japan .................................. 7-018955

[51] Int. Cl.⁷ ............................ H04B 15/00; H04K 1/00; H03D 1/04
[52] U.S. Cl. ........................................... 375/207; 375/343
[58] Field of Search ...................... 375/208, 200, 375/350, 343, 349, 207, 206, 346, 365, 366, 367, 368; 333/193, 194, 196, 195, 133; 435/182.3; 370/342, 335, 479, 320, 441, 515, 209, 336, 337; 300/34

[56] References Cited

U.S. PATENT DOCUMENTS

| | | | |
|---|---|---|---|
| 5,239,496 | 8/1993 | Vancraeynest | 364/728.03 |
| 5,434,893 | 7/1995 | Le Roy et al. | 375/208 |
| 5,491,726 | 2/1996 | Cheng et al. | 375/343 |
| 5,500,872 | 3/1996 | Kinney et al. | 375/208 |
| 5,687,190 | 11/1997 | Tsao | 375/206 |
| 5,689,816 | 11/1997 | Lee et al. | 455/74 |

FOREIGN PATENT DOCUMENTS

| | | |
|---|---|---|
| 5-37491 | 2/1993 | Japan . |
| 6-667569 | 8/1994 | Japan . |
| 5-327661 | 12/1994 | Japan . |

*Primary Examiner*—Chi H. Pham
*Assistant Examiner*—William Luther
*Attorney, Agent, or Firm*—Beall Law Offices

[57] ABSTRACT

A radio receiver apparatus for receiving a spread spectrum signal in which a signal derived through a level detection of a signal demodulated by a correlative demodulator and a signal obtained by extracting a signal component of a synchronous frequency from a reception synchronizing clock are combined to thereby generate a reference signal having a level which changes in accordance with change of the detected signal, and by comparing the detected signal with the reference signal, the received signal is discriminated.

10 Claims, 9 Drawing Sheets

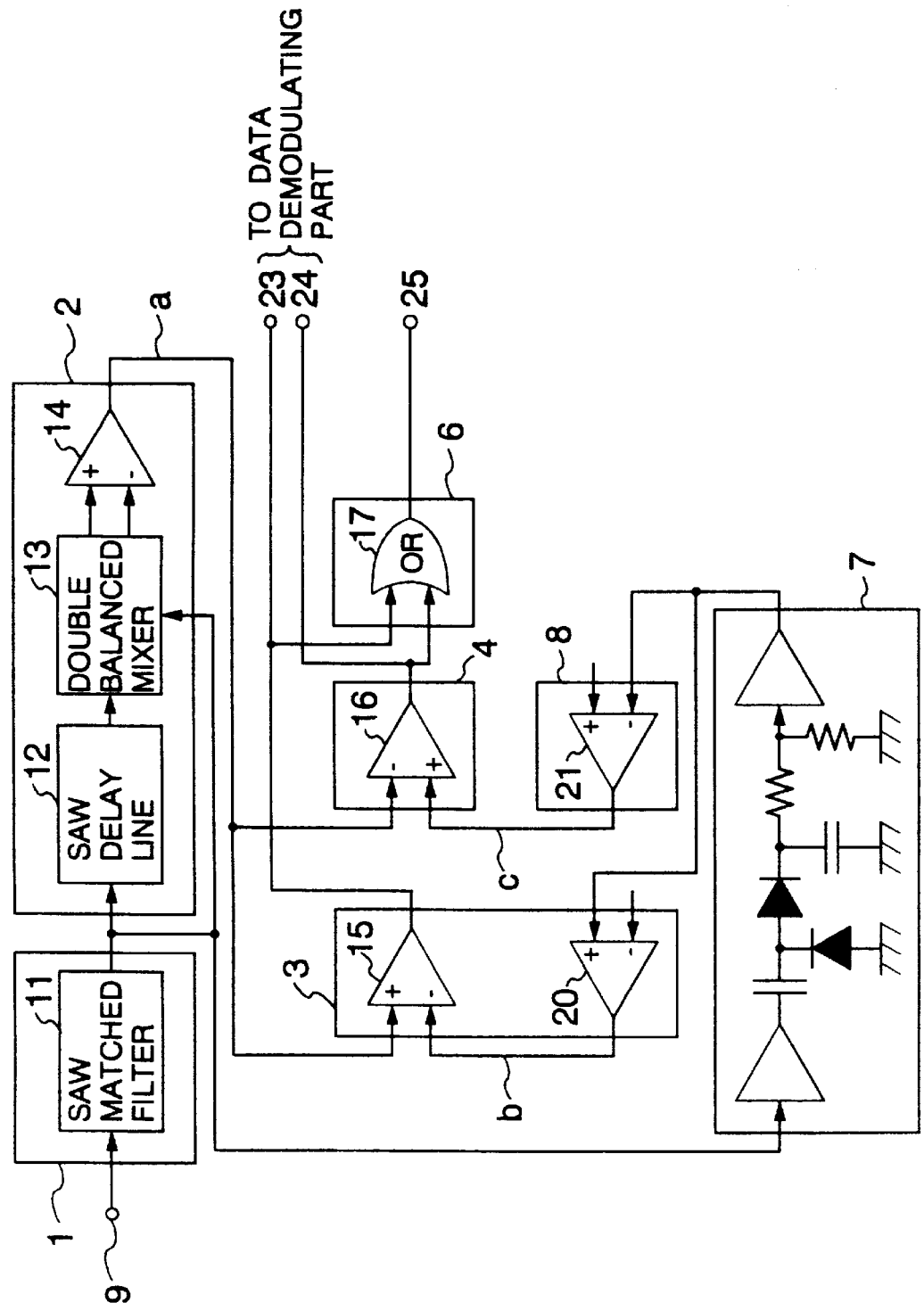

DATA FOR
TRANSMISSON

PN SEQUENCE

OUTPUT WAVEFORM
AT TERMINAL 23

OUTPUT WAVEFORM
AT TERMINAL 24

OUTPUT WAVEFORM
AT TERMINAL 25

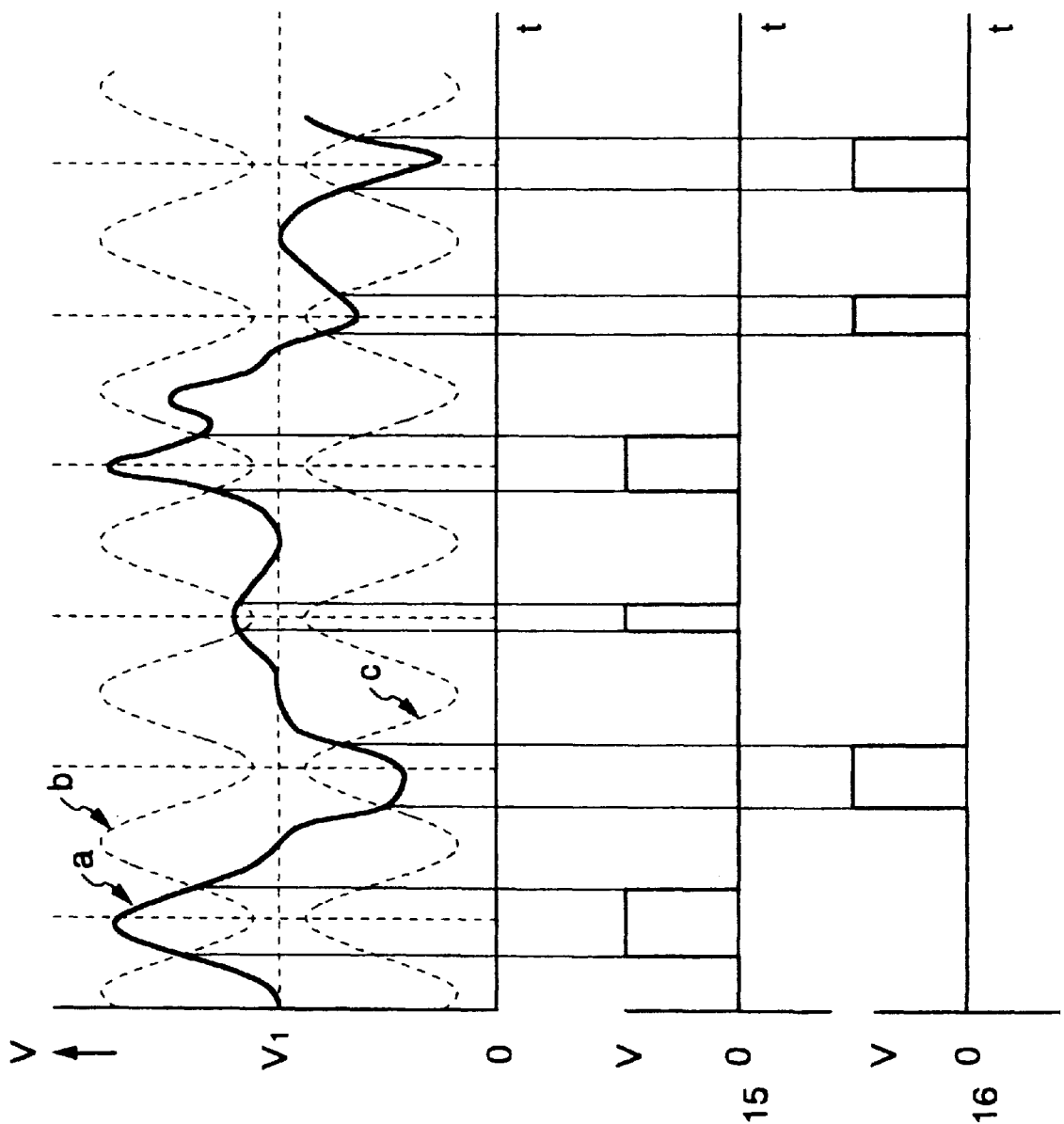

RADIO RECEIVER USING LEVEL-VARIABLE REFERENCE, SIGNAL FOR DISCRIMINATIVE DETECTION OF DATA SIGNAL AND SIGNAL DISCRIMINATION METHOD

BACKGROUND OF THE INVENTION

The present invention relates to a receiver apparatus or equipment for a radio transmission system. More specifically, the present invention is concerned with a radio receiver apparatus for receiving discriminatively intrinsic data or information signals which are transmitted through radio communication between or among office automation apparatuses or machines.

Heretofore, for transfer or communication of information or data among a plurality of office automation (OA) machines, there has been adopted a method of interconnecting the machines to one another through the medium of cables. However, for interconnecting a large number of such machines by cables, troublesome and expensive wiring works are required, which provides difficulty to rearrangement or alteration of the machines upon renewal of office layout as well as installation of additional machines. For solving such problems, there is conceivable a radio or wireless interconnection or communication among the machines by making use of electromagnetic wave or radio channels. However, such wireless communication facilities are not adopted widely because of problems such as limitation imposed to the radio output power as well as carrier frequency, interference with other machines and so forth.

On the other hand, as a communication system designed for specific application, there has been developed a so-called spread spectrum communication system according to which data or information signal is spread over a wide frequency band so as to allow the signal to be transmitted with electromagnetic wave of low power density. This system or scheme is advantageous in that disturbance to the other machines can be suppressed to a minimum and that the system is less susceptible to interference of the other machines because of spreading and demodulation based on a pseudo noise coding or sequentialization. In the spread spectrum communication system, there is adopted a spreading code or sequence generally known as PN code or sequence for modulating the information or data signal over a wide band. However, in the transmitter/receiver system in which the spread spectrum scheme is adopted, the correlative demodulation circuit for demodulating the signal spread by using the PN code or sequence is extremely complicated in respect to the circuit configuration. Under the circumstances, several demodulating schemes have been proposed. Among them, there may be mentioned a scheme or method of employing a SAW (Surface Acoustic Wave) matched filter for the correlative demodulation or detection, as a method capable of demodulating the signal with high reproducibility with a simple circuit configuration, as is disclosed in JP-A-5-327661.

The scheme for reproducing data by detecting correlated data with a delay by using the SAW matched filter as the correlator is certainly advantageous in that the time taken for establishing synchronization can be shortened and that the circuit structure can be simplified without need for PN generating circuit, synchronizing circuit and the like for the demodulation. However, because of the radio communication, the output level after the detection may change finely at random, giving rise to a problem that identification error due to deterioration of the S/N ratio is likely to take place even when the signal level inputted to the demodulator is stabilized by resorting to the AGC (Automatic Gain Control) technique.

SUMMARY OF THE INVENTION

In the light of the state of the art described above, it is an object of the present invention to provide an improved structure of the radio receiving apparatus which can ensure improvement of S/N ratio of the demodulated signal by taking advantage of the characteristics of the SAW matched filter mentioned above.

In view of the above and other objects which will become apparent as the description proceeds, there is provided according to a first general aspect of the invention a first scheme according to which the demodulated output of the SAW matched filter is subjected to a level detection to be thereby used as a reference signal for discriminative identification of the received signal with a delay after detection thereof.

Further provided according to a second general aspect of the invention is a scheme for generating a signal synchronized with a burst-like demodulated signal of the SAW matched filter from a data synchronizing pulse signal derived from the correlative demodulation, whereon the aforementioned signal is superposed onto the reference signal generated according to the first scheme mentioned above.

By detecting the level of the demodulated signal outputted from the SAW matched filter and using it as the reference signal for a comparator which is provided for the signal discrimination after the detection with a delay, it is possible to change or vary the reference signal employed for the discriminative identification of the signal by following minute or fine change of detection output level due to variation of the received signal level, whereby S/N ratio can be protected against deterioration or degradation due to the level variation.

Furthermore, by generating the signal synchronizing with the burst-like demodulated signal of the SAW matched filter from the synchronizing pulse of the data generated through the correlative demodulation and superposing the synchronous signal onto the reference signal mentioned above, the S/N ratio can significantly be improved by broadening the dynamic range with the reference signal being set to a low level at the time point or timing for the signal discrimination or identification, while the level of the reference signal is increased during the other period, to thereby suppress erroneous operation due to noise to a possible minimum.

Thus, according to the teachings of the present invention, the burst-like signal can discriminatively be identified or detected reliably and stably with a simple structure in a system where the signal level varies constantly such as the radio communication system, whereby a radio receiving apparatus ensuring an improvement of the S/N ratio of the received signal.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 2 is a circuit diagram showing in concrete an exemplary circuit configuration of the radio receiver shown in FIG. 1;

FIGS. 6A, 6B and 6C are waveform diagrams illustrating input and output signals of comparators shown in FIG. 5;

DESCRIPTION OF THE PREFERRED EMBODIMENTS

Figure 1:
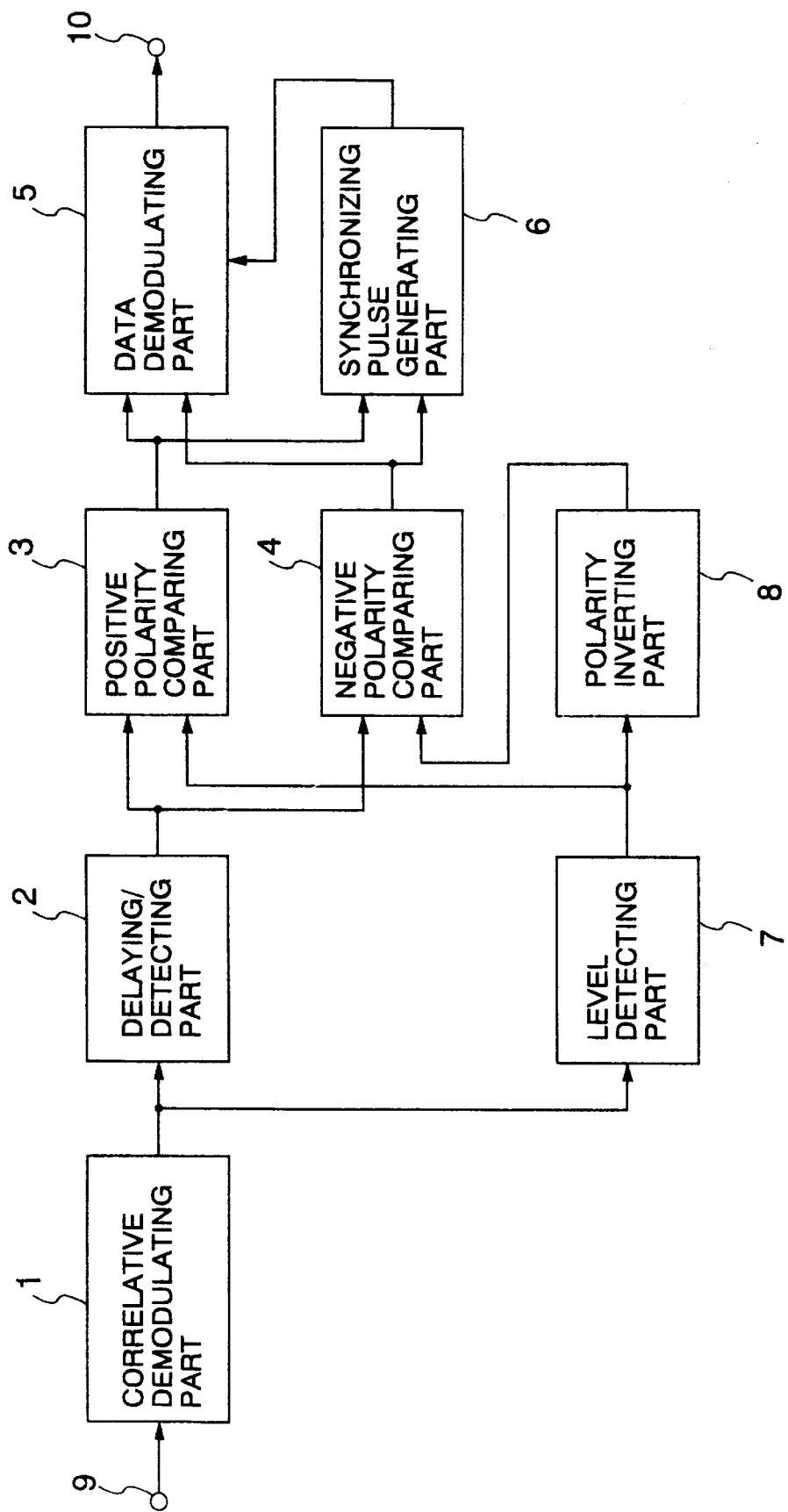
FIG. 1 is block diagram showing a structure of a radio receiver according to an embodiment of the present invention.

Now, the present invention will be described in detail in conjunction with what is presently considered as preferred or typical embodiments thereof by reference to the drawings. In the following description, like reference characters designate like or corresponding parts throughout the several views.

FIG. 1 is block diagram showing a structure of a radio receiver according to an embodiment of the present invention. In the figure, reference numeral 1 denotes a correlative demodulation part, 2 denotes a delaying/detecting part, 3 denotes a positive polarity comparing part, 4 denotes a negative polarity comparing part, 5 denotes a data demodulating part, 6 denotes a synchronizing pulse generating part, 7 denotes a level detecting part, 8 denotes a polarity inverting part, 9 denotes a received signal input part and a reference numeral 10 denotes a demodulated data output part.

In the case of the receiver according to the instant embodiment of the invention, it is presumed that data transmitted and received has undergone a DPSK (Differentially Encoded Phase Shift Keying) modulation and then a spreading modulation by using a high-speed clock signal, whereby a spectrum spread signal is derived to be sent out from the transmitter. In the receiver, this signal is caught by an antenna and inputted to the correlative demodulating part 1 by way of the received signal input part 9 after having been amplified to a prescribed level. The correlative demodulating part 1 matches the received signal with a preset spread code or sequence. When coincidence results from the matching, the correlative demodulating part 1 outputs a burst-like demodulated signal which is then inputted to the delaying/detecting part 2. Because of the DPSK modulation performed on the side of the transmitter, there are outputted from the delaying/ detecting part 2 burst-like detection signals of positive and negative polarities, respectively, in dependence on the phase of the demodulated output, which signals are then inputted to the positive polarity comparing part 3 and the negative polarity comparing part 4, respectively. Furthermore, the burst-like demodulated signal outputted from the correlative demodulating part 1 undergoes level detection in the level detecting part 7. The output of the level detecting part 7 is directly inputted to the positive polarity comparing part 3 as a reference voltage and at the same time to the negative polarity comparing part 4 as a reference voltage after having been inverted by the polarity inverting part 8. The positive polarity comparing part 3 and the negative polarity comparing part 4 determine the polarity of the output of the delaying/detecting part 2, the results of which are then supplied to the data demodulating part 5 and the synchronizing pulse generating part 6, respectively. The data demodulating part 5 demodulates the data derived from the outputs of the positive polarity comparing part 3 and the negative polarity comparing part 4, respectively. The demodulated data are then set out from the demodulated data output part 10 in the timing determined by a data clock signal generated by the synchronizing pulse generating part 6. Owing to the level detection of the burst-like demodulation output of the correlative demodulating part 1 by the level detecting part 7 to thereby obtain the comparison reference voltages for the polarity comparing parts 3 and 4, respectively, the reference voltages for the polarity comparing parts 3 and 4 change as the detection level outputted from the delaying/detecting part 2 varies in following variation in the level of the received signal. Thus, there can be realized a stable data demodulation notwithstanding of variation of the received signal level which is brought about by changes in the radio transmission environment.

In the case of the illustrated embodiment, the output of the correlative demodulating part 1 is inputted to the level detecting part 7. It should however be noted that similar effects can equally be obtained by the level detection of the output of the delaying detecting part. Further, although not illustrated in detail, a part of the output of the level detecting part 7 is fed back to a gain control/amplifier part provided at a stage preceding to the received signal input part 9 so that the signal level inputted to the input part 9 is controlled to be constant notwithstanding of change of the reception level. Since the signal as inputted contains a signal component corresponding to the data and noise components, change of level of noise is reflected as a change of the level of the signal component.

FIG. 2 is a circuit diagram showing in concrete an exemplary circuit configuration of the receiver shown in FIG. 1. In FIG. 2, parts which serve for the same functions as those described above by reference to FIG. 1 are denoted by like reference numerals, and repeated description thereof will be omitted. Referring to FIG. 2, a reference numeral 11 designates a SAW (Surface Acoustic Wave) matched filter which is incorporated in or which corresponds to the correlative demodulating part 1 mentioned previously. Further, a numeral 12 denotes a SAW (Surface Acoustic Wave) delay line, 13 denotes a double balanced mixer (DBM), and a numeral 14 denotes an amplifier circuit, wherein the SAW delay line 12, the double balanced mixer 13 and the amplifier circuit 14 cooperate to constitute a circuitry corresponding to the delaying/detecting part 2. Furthermore, reference numeral 15 denotes a comparator and 20 denotes an amplifier circuit, both of which correspond to the positive polarity comparing part 3. On the other hand, the negative polarity comparing part 4 is constituted by a comparator 16. Moreover, a numeral 17 designates an OR circuit which corresponds to the synchronizing pulse generating part 6. Additionally, a reference numeral 21 designates an amplifier circuit which corresponds to the polarity inverting part 8. Finally, reference numeral 23 and 24 denote terminals of positive and negative polarities, respectively, while a numeral 25 denotes a synchronizing pulse output terminal.

In the case of the instant embodiment of the invention, a SAW matched filter 11 is employed as the correlative demodulator for the received spread signal, wherein the spread signal received from the antenna is amplified to a preset level to be subsequently inputted to the SAW matched filter 11 from the received signal input part 9. In the SAW matched filter 11, there has previously been provided the spread code or sequence in the form of a corresponding electrode pattern. When the spread sequence of the received signal coincides with the electrode pattern of the SAW matched filter 11, the received signal of one period is added in phase, whereby a burst-like demodulated signal is outputted in every period. The demodulated signal is so distributed that a part thereof is inputted intact to the double balanced mixer 13, while other part is inputted to the double balanced mixer 13 after having been delayed for one period by the SAW delay line 12. Because of the DPSK modulation performed previously on the transmitter side, there makes appearance at the output of the double balanced mixer 13 a burst-like detection output of positive or negative polarity in dependence on the phase of the demodulated output signal. The detection output of the double balanced mixer 13 is applied to the inputs of the comparators 15 and 16, respectively, after having been amplified by the amplifier circuit 14.

Figure 3A:
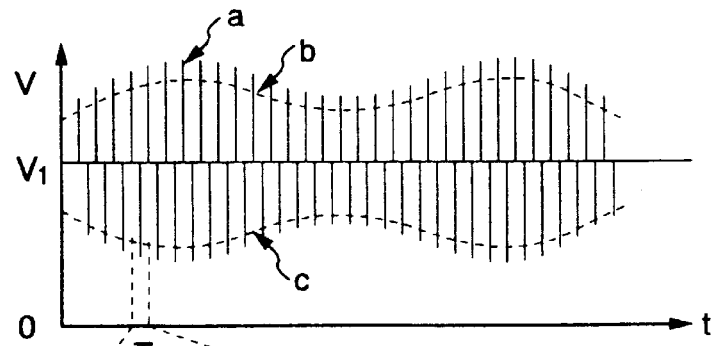
FIG. 3A is a waveform diagram showing a waveform in a signal discriminating part of the receiver shown in FIG. 1.
Figure 3B:
FIG. 3B is a waveform diagram showing a data signal for transmission.
Figure 3C:
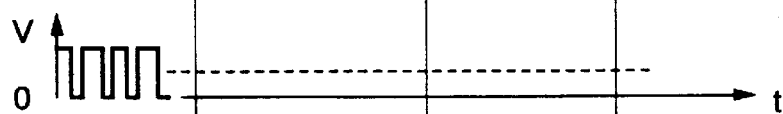
FIG. 3C is a waveform diagram showing a waveform of the data signal for transmission after modulation with a PN code or sequence.
Figure 3D:
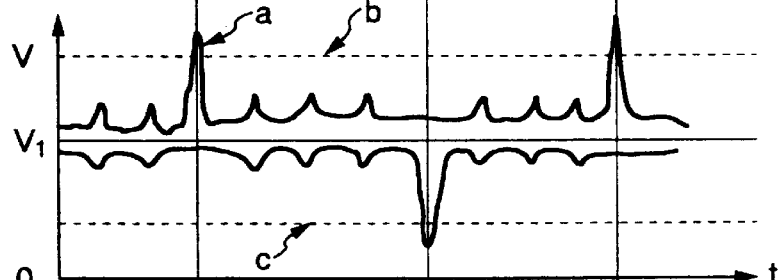
FIG. 3D is a waveform diagram showing a waveform of a signal inputted to a comparator shown in FIG. 2.

FIG. 3A is a waveform diagram showing a waveform in the signal discriminating part of the receiver. Further, FIGS. 3B to 3G are waveform diagrams illustrating exaggeratedly relations between the data for transmission and the demodulated waveform in a temporal period "T" shown in FIG. 3A. More specifically, FIG. 3B is a waveform for illustrating the data as transmitted, FIG. 3C is a waveform diagram showing a waveform of the data signal for transmission after modulation with a PN code or sequence, and FIG. 3D is a waveform diagram showing a waveform of the demodulated output signal of the amplifier circuit 14.

In FIG. 3D, the time is taken along the abscissa with the amplitude of the output signal of the amplifier circuit 14 being taken along the ordinate. As can be seen in FIG. 3D, for the voltage level $V_1$ during a period in which the modulated signal is absent, a burst-like detection output "a" of positive or negative polarity is produced in every period of the spread sequence, i.e., at every data bit of the transmitted signal, wherein by detecting discriminatively the polarity of this detection output signal, it is possible to perform the data demodulation. A part of the burst-like demodulated output of the SAW matched filter 11 is distributed to two parts after having undergone level detection in the level detecting part 7, wherein one part of the burst-like demodulated output of the SAW matched filter 11 is applied to the reference signal input terminal of the comparator 15 as a threshold voltage after amplification in the amplifier circuit 20. The comparator 15 compares the output signal of the delaying/detecting part 2 with the reference signal mentioned above to thereby extract the burst signal of positive polarity, which is then outputted from the positive polarity detection output terminal 23. On the other hand, the other part of the output of the level detecting part 7 undergoes polarity inversion in the amplifier circuit 21 relative to the reference voltage ($V_1$ in FIG. 3D) to be subsequently applied to the reference signal input terminal of the comparator 16 as a threshold voltage after amplification. In the comparator 16, the output of the delaying/detecting part 2 is compared with the reference signal, whereby the burst signal of negative polarity is extracted to be outputted from the negative polarity detection output terminal 24.

Figure 3E:
FIGS. 3E, 3F and 3G are waveform diagrams showing signal waveforms making appearance at terminals (23, 24 and 25) of the receiver shown in FIG. 2.
Figure 3F:
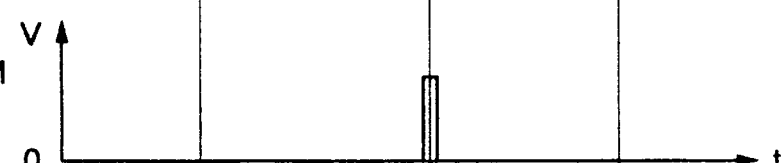

FIG. 3D is a waveform diagram sowing an output voltage "b" of the amplifier circuit 20 and an output voltage "c" of the amplifier circuit 21. Further, FIGS. 3E and 3F are waveform diagrams showing signal waveforms making appearance at the positive and negative polarity detection output terminals 23 and 24, respectively.

Figure 3G:
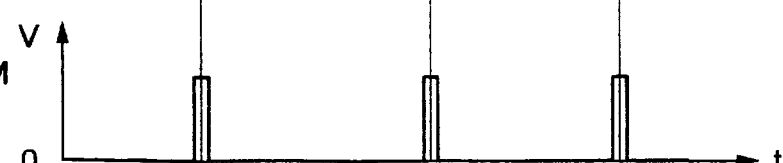

Since the comparison reference signals "b" and "c" are generated by the level detecting part 7, the levels of these reference signals "b" and "c" change in following the change of the levels of the burst signals of negative and positive polarities, respectively, which are outputted from the amplifier circuit 14. Thus, it is possible to perform the detection stably without deviating from the peak of the burst signal notwithstanding of fine fluctuation of the burst signal level, as can be seen in FIG. 3A. Thus, the received data can be reconstituted or reproduced on the basis of the outputs available from the positive polarity detection output terminal 23 and the negative polarity detection output terminal 24. Besides, by logically summing the outputs of the comparators 15 and 16 by the OR circuit 17, a pulse signal (reception clock signal) synchronized to the burst-like demodulated signal as shown in FIG. 3G can be obtained to be subsequently outputted from the synchronizing pulse output terminal 25.

As is apparent from the foregoing, by virtue of such arrangement taught by the invention that the level of the burst-like demodulated output of the SAW matched filter 11 is detected by the level detecting part 7 to be used as the comparison reference voltage for the comparators 15 and 16 for the purpose of polarity detection, stable data demodulation can be accomplished regardless of minute or fine fluctuation of the received level as brought about by environmental factors for the radio transmission or communication because when the signal levels inputted to the comparators 15 and 16 change in response to change of the demodulated level outputted from the SAW matched filter 11 due to change of the received signal level, then the reference voltage for these comparators 15 and 16 change correspondingly.

Although the SAW matched filter is employed as the correlative demodulator in the receiver according to the instant embodiment of the invention, similar advantageous effects can be obtained by using other type correlative demodulator such as a SAW convolver, a digital matched filter or the like.

Figure 4:
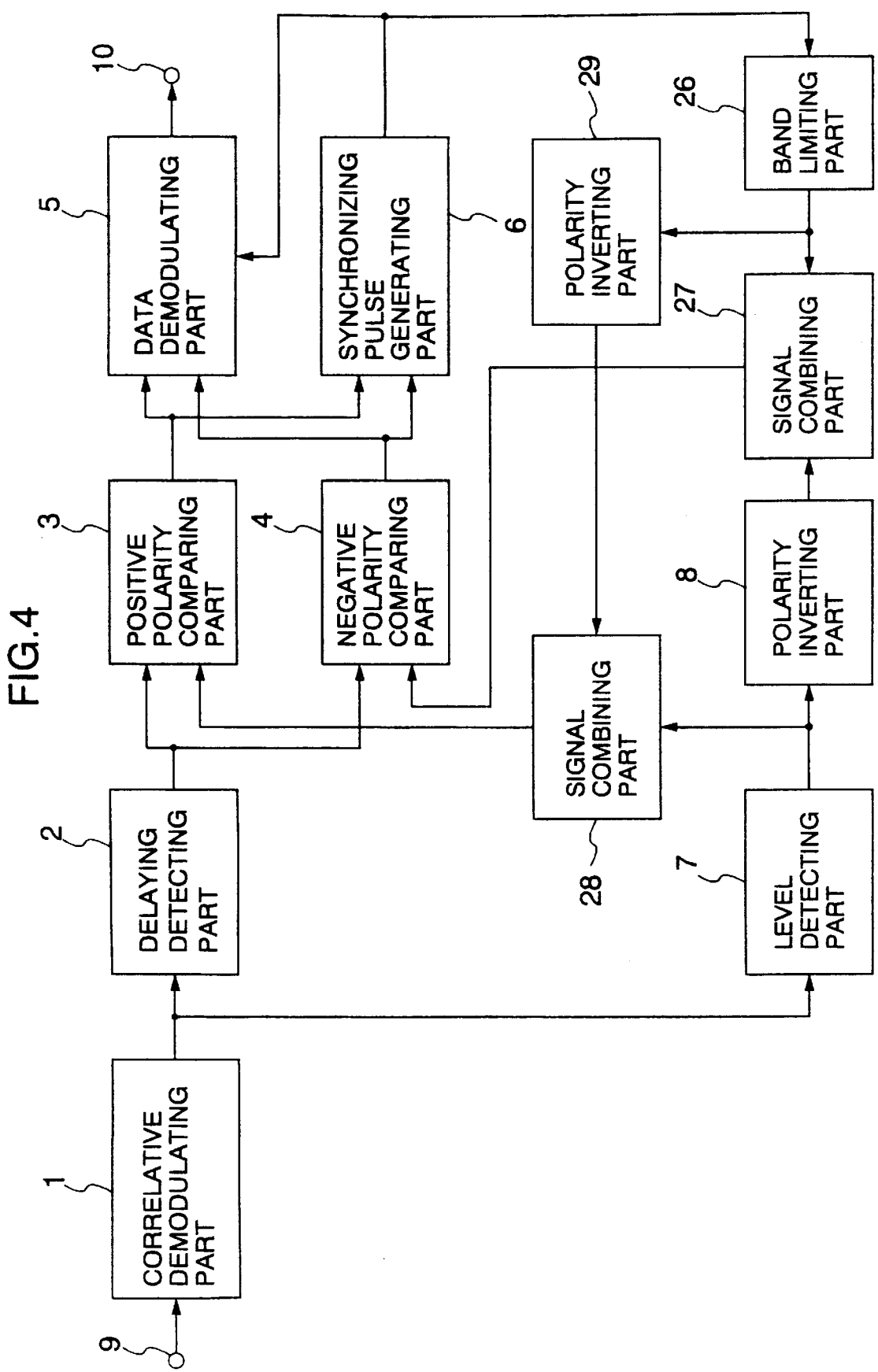
FIG. 4 is a block diagram showing a structure of a radio receiver according to another embodiment of the present invention.

FIG. 4 is a block diagram showing a structure of a radio receiver according to another embodiment of the present invention. In the figure, parts serving for same or equivalent functions as those shown in FIG. 1 are denoted by using same reference numerals and repeated description thereof is omitted. Referring to FIG. 4, reference numeral 26 denotes a band limiting part, 27 and 28 denote signal synthesizing or combining parts, respectively, and a numeral 29 denotes a polarity inverting part. In the following, description concerning the operation similar to that of the receiver shown in FIG. 1 will be omitted.

Referring to FIG. 4, a part of the output of the synchronizing pulse generating part 6 is supplied to the band limiting part 26 which is designed to pass therethrough only the frequency component matched with the period of the demodulated burst signal, whereby a sinusoidal waveform signal of a same period as that of the demodulated burst signal is extracted. A part of the output of the band limiting part 26 is synthesized or combined with the output of the level detecting part 7 by the signal combining part 28 after polarity inversion in the polarity inverting part 29, wherein the output of the signal synthesizing or combining part 28 is supplied to the positive polarity comparing part 3 as a reference signal for comparison. Furthermore, the other part of the output of the band limiting part 26 is combined with the output of the polarity inverting part 8 by the signal combining part 27 and then inputted to the negative polarity comparing part 4 as the reference signal. In the case of the receiver shown in FIG. 1, the output of the level detecting part 7 is made use of as the reference signal for comparison for the positive polarity comparing part 3 and the negative polarity comparing part 4. In this conjunction, it is noted that in the radio transmission, the demodulated level fluctuates from one to another period, as a result of which when the reference voltage is set at a level close to the peak value of the burst-like detection signal, erroneous operation may possibly be brought about due to fluctuation of the detection output level. On the other hand, when the reference voltage is set close to a quiescent level, there may arise a problem that unwanted signal components originating in noise, disturbing signals and the like except for the demodulated signal may be picked up. In contrast, in the case of the receiver according to the instant embodiment (FIG. 4), the reference voltage is set low during a period in which the burst-like demodulated signal exists for thereby improving the dynamic characteristics of the receiver, while during the period in which the burst-like signal is absent, the reference voltage is set high for preventing erroneous operation due to the unwanted signal components, whereby the S/N ratio can be improved without need for using any especial synchronizing circuit.

Figure 5:
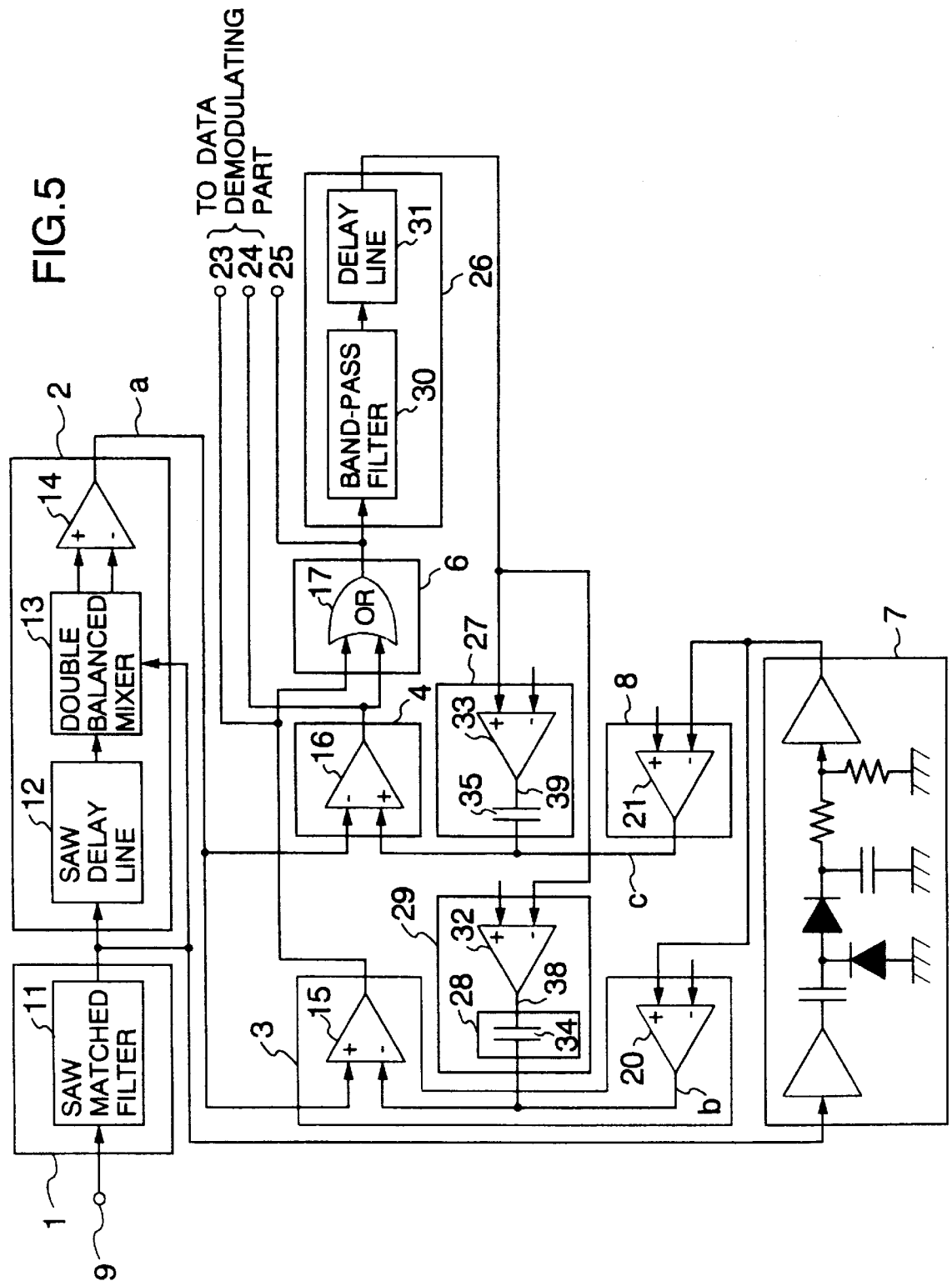
FIG. 5 is a circuit diagram showing in concrete an exemplary circuit configuration of the receiver shown in FIG. 4.

FIG. 5 is a circuit diagram showing in concrete an exemplary circuit configuration of the receiver according to the instant embodiment of the present invention shown in FIG. 4. In FIG. 5, parts serving for same or equivalent functions as those shown in FIG. 2 are denoted by like reference symbols, and correspondence relations to the blocks shown in FIG. 4 are designated by corresponding block identifying numerals. In FIG. 5, reference numerals 30 denotes a band-pass filter, 31 denotes a delay line, 32 and 33 denote amplifier circuits, respectively, and numerals 34 and 35 denote capacitors, respectively. A part of the output of the OR circuit 17 is inputted to the band-pass filter 30 which can pass therethrough only the demodulated clock frequency, whereby a sinusoidal waveform signal of the clock frequency is selectively obtained from the output of the band-pass filter 30. Delay which the sinusoidal waveform signal suffers is then corrected by the delay line 31 so as to have the timing matched with the demodulated burst signal. Thereafter, the output signal of the delay line 31 is amplified and combined or synthesized with outputs of the amplifier circuits 20 and 21 via the capacitors 34 and 35 after amplification by the amplifier circuits 32 and 33, respectively, to be used as the comparison reference signals for the amplifier circuits 15 and 16, respectively.

FIGS. 6A, 6B and 6C are waveform diagrams illustrating the input signal and the output signals of the comparators 15 and 16, respectively, in which time is taken along the abscissa with voltage taken along the ordinate.

In the figures, a signal "a" represents the output of the amplifier circuit 14 which is to be inputted to the comparators 15 and 16, respectively, as the detection output signal.

Further, signals "b" and "c" represent the output signals of the amplifier circuits 20 and 21 which are superposed with the output signals of the amplifier circuits 32 and 33 via the capacitors 34 and 35, respectively. These signals are inputted to the comparators 15 and 16 as the reference signals for detecting the received signal. Since the original signal used for forming the signals "b" and "c" is a signal which is obtained by delaying signal "a" by one period of the signal "a" by the delay line 31, synchronization in phase is essentially established between the signal "a" and the signals "b" and "c".

The signal "b" is generated by amplifying the output signal of the level detecting part 7, while the signal "c" is derived by inverting the output signal of the level detecting part 7 relative to the reference voltage $V_1$. To this end, the amplification factor is selectively so determined that error involved in the signal detection or discrimination can be suppressed to minimum while ensuring a maximum S/N ratio by taking into consideration various values relating to electric field intensity for reception as well as noise environment.

The burst signal is detected at predetermined signal positions which are determined on the basis of a predetermined period corresponding to the transmitted data. In this conjunction, it is noted that when the burst-like signal "a" is positive at a predetermined signal position, i.e., when it is outputted as the burst-like signal of positive polarity relative to the reference voltage $V_1$, the level of the reference signal "b" is low, while when the burst-like signal "a" is negative at a predetermined position, i.e., when it is outputted as the burst-like signal of negative polarity relative to the reference voltage $V_1$, the reference signal "c" assumes a high level, as can be seen from FIG. 6A.

Further, each of the signals "b" and "c" is a sinusoidal wave having a same period as that of the fundamental wave component of the signal "a". Additionally, the signals "b" and "c" have respective phases inverted relative to each other. Consequently, in a region or range in which noise having positive polarity relative to the reference voltage $V_1$ is expected, the level of the signal "b" is set high for inhibiting detection of noise of positive polarity. On the other hand, in a region in which noise having negative polarity relative to the reference voltage $V_1$ is expected, the level of the signal "c" is lowered so that the noise component of negative polarity is excluded from detection.

Thus, in the receiver shown in FIG. 5, erroneous detection due to fluctuation of the detection output level can be prevented with a high ratio or high reliability, to say in another way, whereby the S/N ratio of the received and demodulated signal in the radio transmission can significantly and remarkably improved.

Figure 7A:
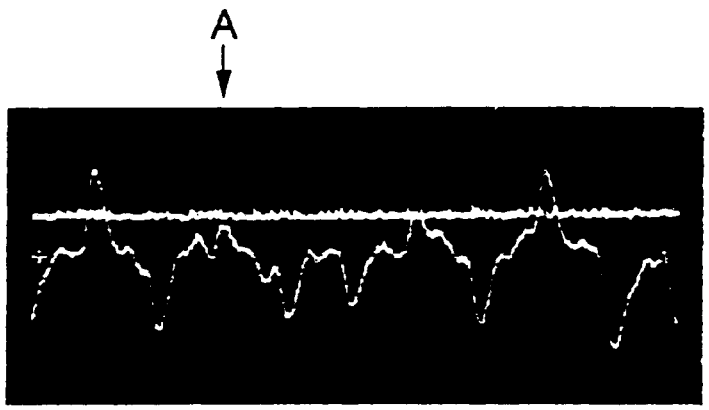
FIG. 7A shows, by way of example, conventional signal discrimination.
Figure 7B:
FIG. 7B shows an exemplary signal discrimination realized with the receiver implemented in the configuration shown in FIG. 5.

FIGS. 7A and 7B show waveforms obtained experimentally for illustrating difference between the conventional signal detection known heretofore and the signal detection performed by using the reference signal according to the present invention. More specifically, FIG. 7A shows the result of signal detection where the signal discrimination level is set at a DC level, and FIG. 7B shows the corresponding result obtained with the receiver implemented in the configuration shown in FIG. 5. In both cases, signal detection or discrimination based on the positive polarity is shown.

Referring to FIG. 7A, it can be seen that a burst-like signal of positive polarity must inherently make appearance at a point "A". However, due to noise and fluctuation, the signal level suffers abnormality, making it impossible to detect the positive burst-like signal. By contrast, when the same detection output signal is inputted to the signal discrimination circuit shown in FIG. 5, the reference signal for the comparator changes, as indicated by the signal "b", in FIG. 6A. Thus, the signal of positive polarity can correctly be detected even at a location corresponding to "A" as shown in FIG. 7B.

According to the teachings of the invention, the amplitude (peak-to-peak magnitude) of the positive reference signal is so set as to fall within a range of 50% to 150% of the amplitude of the normal positive burst-like signal. By way of example, in the case of the embodiment illustrated in FIG. 7B, the amplitude (peak-to-peak value) of the positive reference signal is set so as to assume substantially same amplitude as that of the normal positive burst-like signal. Of course, the amplitude of the negative reference signal is set similarly to the positive reference signal.

The receiver according to the instant embodiment of the invention described above can be implemented in a simple structure without need for using a synchronizing circuit of high accuracy because improvement of the dynamic characteristics of the receiver is accomplished by resorting to analogue technique. Moreover, fluctuation of the signal level due to various environmental factors in the radio communication, fluctuation of the data clock in the transmission equipment, swing or changes of phase due to multiple path and other which may provide causes for minute variation of the clock periodicity can flexibly be coped with.

Figure 8:
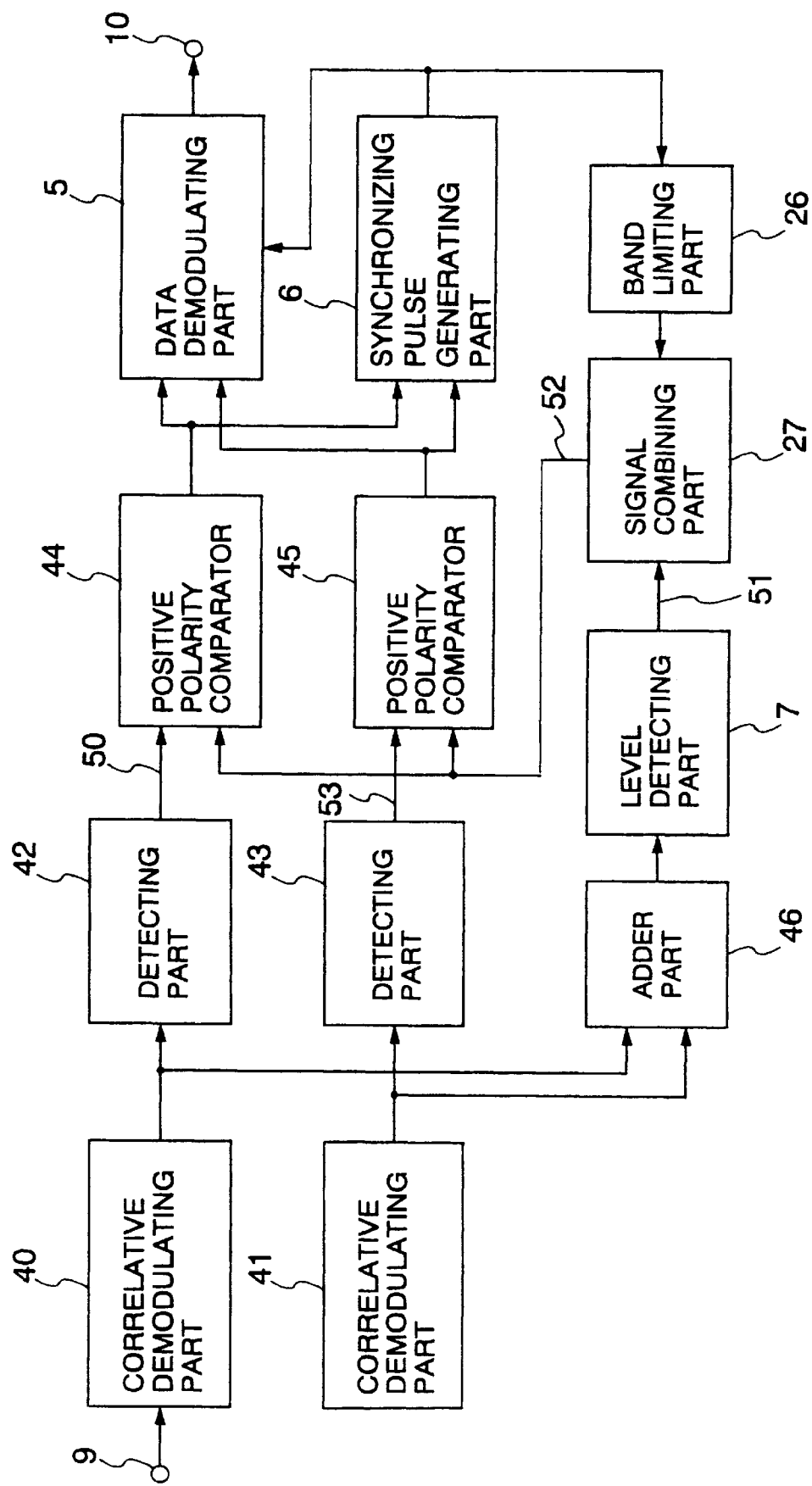
FIG. 8 is a block diagram showing a structure of a radio receiver apparatus according to another embodiment of the present invention.

FIG. 8 is a block diagram showing a structure of radio receiving equipment according to another embodiment of the present invention. In the figure, parts serving for equivalent or same functions as those described hereinbefore by reference to FIG. 4 are denoted by like reference characters and repeated description thereof is omitted. In FIG. 8, reference numerals 40 and 41 denote correlative demodulating parts, respectively, for demodulating codes or sequences differing mutually, 42 and 43 denote detecting parts, respectively, 44 and 45 denote positive polarity comparators, respectively, and a numeral 46 denotes an adder part. In the receiving apparatus shown in FIG. 4, it is presumed that data for transmission undergo a DPSK modulation by using spread sequence which remains invariable. By contrast, in the receiving apparatus shown in FIG. 8, it is presumed that the spreading code or sequence is changed in correspondence to the data for transmission, as indicated by PN1 and PN2. Referring to FIG. 8, the signal received through the medium of antenna is amplified to a prescribed level to be subsequently inputted to the correlative demodulating parts 40 and 41 from the received signal input part 9.

The correlative demodulating parts 40 and 41 match or collate the received signal with preset spreading codes or sequences. Upon coincidence between the received signal and one of the spread codes or sequences, a burst-like demodulated signal is outputted from the relevant demodulating part, whereon the demodulated output is detected by the detecting part 42 or 43. In secession, presence or absence of the signal is discriminated by the positive polarity comparator 44 or 45, which is then followed by demodulation of the data by the data demodulating part 5. Subsequently, the demodulated data is outputted from the demodulated data output part 10 in timing or synchronism with the data clock generated by the synchronizing pulse generating part 6.

Since the burst-like demodulated data signal is outputted from either one of the correlative demodulating part 40 or 41 in dependence on the data as received, the outputs of the correlative demodulating parts 40 and 41 are added together by the adder part 46, output of which then undergoes level detection by the level detecting part 7, wherein the signal 51 as obtained is synthesized or combined by the signal combination part 27 with a sinusoidal waveform of a same period as the demodulated burst-like signal extracted from the synchronizing pulse generating part 6 via the band limiting part 26, to thereby obtain a signal 52, which is then used as the comparison reference voltage for the positive polarity comparators 44 and 45, respectively. By virtue of such arrangement as described above, the reference voltage for the positive polarity comparators 44 and 45, respectively, change in correspondence to change of the level of the output from the detecting parts 42 and 43 due to variation of the received signal level, as in the case of the radio receiving apparatus shown in FIG. 4. Thus, a stable data demodulation can be realized in spite of possible level change or variation of the received signal due to fluctuation of the radio communication environment.

Figure 9A:
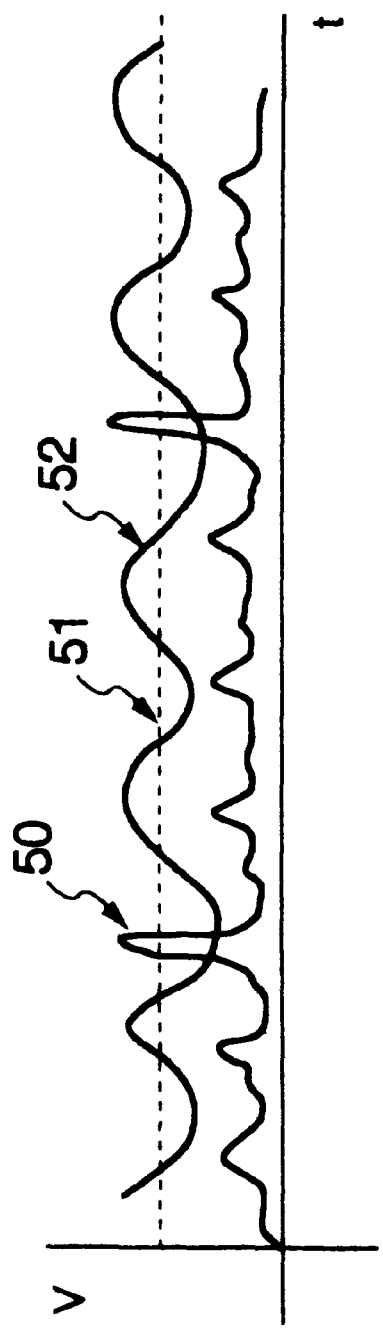
FIGS. 9A and 9B show waveform diagrams for illustrating a relation between a detection output waveform and a reference signals in the receiver shown in FIG. 8.
Figure 9B:
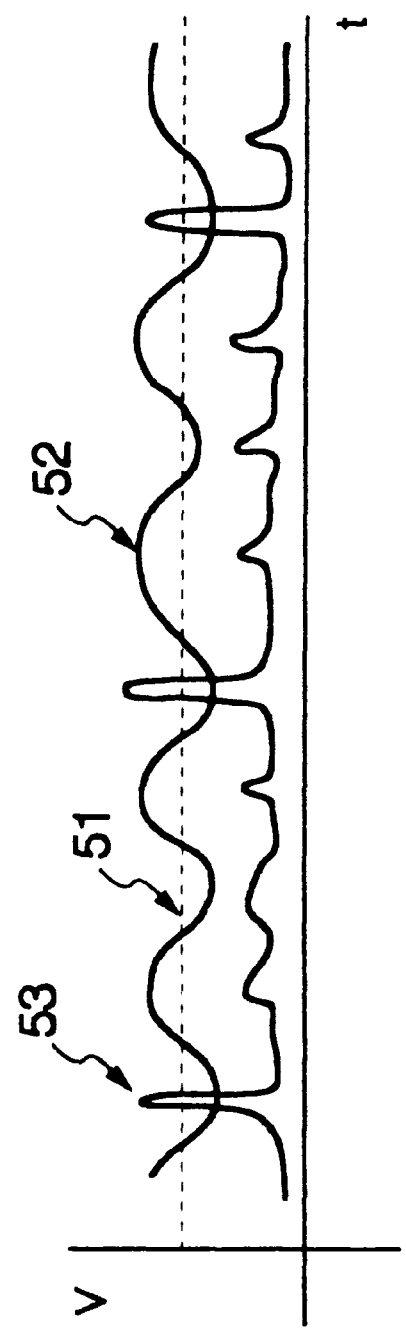

FIGS. 9A and 9B show waveform diagrams for illustrating the signals 50, 51, 52 and 53 generated in the radio receiver apparatus shown in FIG. 8.

In the receiver apparatus according to the instant embodiment of the invention, it is assumed that the spread sequence or code is changed in correspondence to the data for transmission. It should however be appreciated that similar advantageous effects can equally be obtained even in the case where the parameter such as frequency or the like is changed in place of the spread code or sequence.

Although the foregoing description has been directed to the spectrum spread type receiving apparatus, it should be appreciated that the teachings of the present invention can equally be applied to other systems designed for processing other type burst-like signals.

Many modifications and variations of the present invention are possible in the light of the above techniques. It is therefore to be understood that within the scope of the appended claims, the invention may be practiced otherwise than as specifically described.

We claim:

1. A radio receiver apparatus, comprising:

correlative demodulating means for demodulating correlatively a spread signal;

detecting means for detecting a correlation signal demodulated by said correlative demodulating means;

level detecting means for detecting a level of the correlation signal;

means for generating a dynamic reference signal for signal discrimination from a level detection signal outputted from said level detecting means on a basis of the level detected;

comparing means for comparing a detection signal outputted from said detecting means with said dynamic reference signal; and data demodulating means for demodulating data from a compared signal outputted from said comparing means.

2. The radio receiver apparatus according to claim 1, further comprising:

synchronization pulse generating means for generating from the compared signal a synchronized pulse signal synchronized with the detection signal;

means for extracting a signal component of a synchronous frequency from the synchronized pulse signal; and delay means for delaying an output of said extracting means for a predetermined time period, wherein said means for generating said dynamic reference signal further includes means for generating said dynamic reference signal by combining the output of said delay means and the detection signal.

3. The radio receiver apparatus according to claim 1, said dynamic reference signal generating means including:

means for generating a first reference signal for discriminating detection output of positive polarity; and means for generating a second reference signal for discriminating detection output of negative polarity, wherein said comparing means includes:

first comparing means for comparing the detection output of positive polarity with said first reference signal; and second comparing means for comparing the detection output of negative polarity with said second reference signal.

4. The radio receiver apparatus according to claim 3, wherein said means for generating said dynamic reference signal includes:

means for generating from the level detection signal said first reference signal of a same polarity as that of the level detection signal; and means for generating said second reference signal by inverting the level detection signal relative to a predetermined reference signal.

5. The radio receiver apparatus according to claim 2, said dynamic reference signal generating means including:

means for generating a first reference signal for discriminating detection output of positive polarity; and means for generating a second reference signal for discriminating detection output of negative polarity, wherein said comparing means includes:

first comparing means for comparing the detection output of positive polarity with said first reference signal; and second comparing means for comparing the detection output of negative polarity with said second reference signal.

6. The radio receiver apparatus according to claim 5, wherein said means for generating said dynamic reference signal includes:

means for generating said first reference signal of a same polarity as that of the level detection signal; and means for generating said second reference signal by inverting the level detection signal relative to a predetermined reference signal.

7. The radio receiver apparatus according to claim 1, wherein said correlative demodulating means includes a SAW matched filter.

8. A radio receiver apparatus, comprising:

correlative demodulating means for demodulating correlatively signals spread by different modulating signals, said correlative demodulating means being provided in accordance with types of said modulating signals, respectively;

detecting means for detecting correlation signals demodulated by said correlative demodulating means separately from each other;

level detecting means for combining the correlation signals, thereby detecting a level;

means for generating a dynamic reference signal for signal discrimination from a level detection signal outputted from said level detecting means on a basis of the level detected;

comparing means for comparing a detection signal outputted from said detecting means with said dynamic reference signal; and data demodulating means for demodulating data from a compared signal outputted from said comparing means.

9. The radio receiver apparatus according to claim 8, further comprising:

synchronization pulse generating means for generating from the compared signal a synchronized pulse signal synchronized with the detection signal;

means for extracting a signal component of a synchronous frequency from the synchronized pulse signal; and delay means for delaying an output of said extracting means for a predetermined time period, wherein said means for generating said dynamic reference signal further includes means for generating said dynamic reference signal by combining an output of said delay means and the level detection signal.

10. A discriminative signal identification method in a spread spectrum type radio receiver, comprising the steps of:

demodulating correlatively a spread signal;

detecting a level of a correlation signal demodulated by a correlative demodulating part;

generating a first signal for received signal discrimination from a level detection signal obtained in said step of detecting the level on a basis of the level detected;

extracting a signal component of a synchronous frequency from a reception synchronizing clock;

generating a second signal synchronized with a detection signal obtained by detecting the correlation signal by delaying the signal component of the synchronous frequency for a predetermined time period;

generating a dynamic reference signal for discrimination of a received signal by combining said first and second signals; and discriminating the received signal by comparing said dynamic reference signal with the detection signal.

* * * * *